3 Sheets—Sheet 1.

J. F. SARGENT, dec'd,

G. McKay, principal trustee, and J. W. Brooks, associate trustee, of The McKay Metallic Fastening Association, assignees by mesne assignments.

NAILING OR PEGGING MACHINE.

No. 9,888. Reissued Oct. 4, 1881.

Fig. 1.

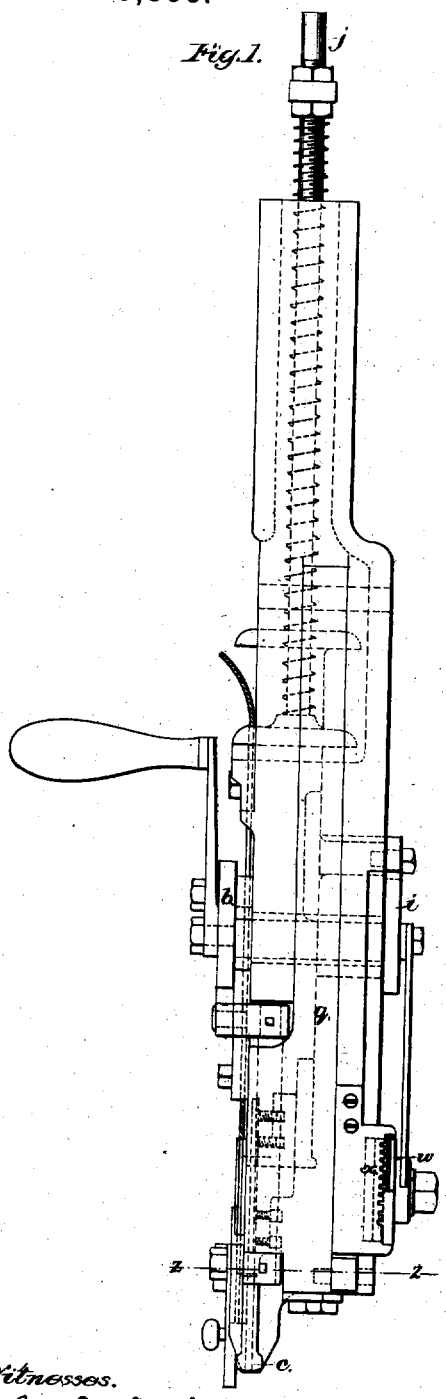

Fig. 2.

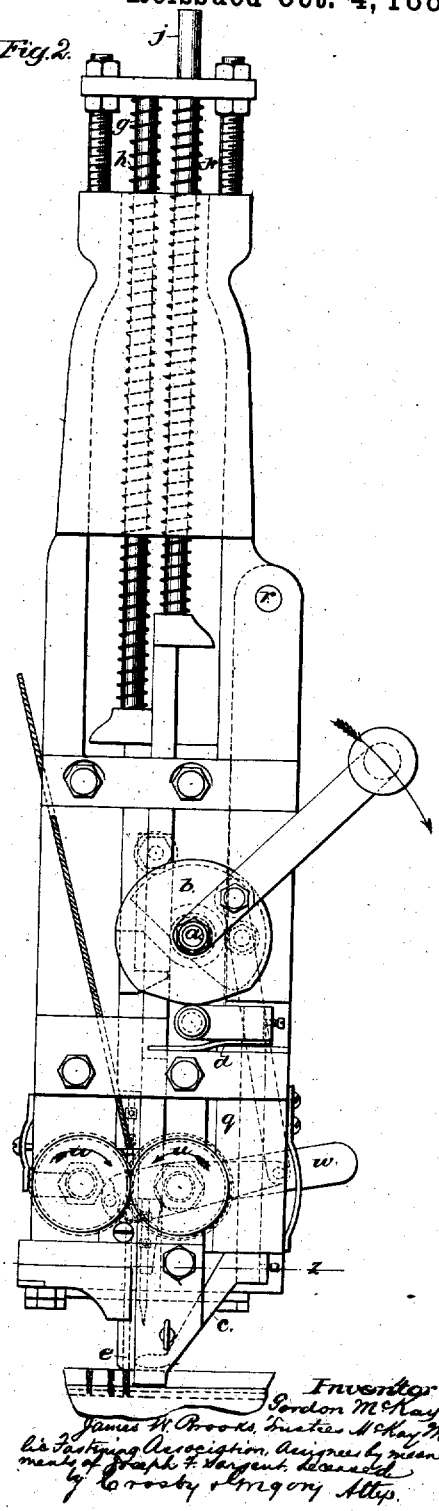

Witnesses.
John F. C. Frankert
Jos. P. Livermore

Inventor
Gordon McKay
James W. Brooks, Trustee McKay Metallic Fastening Association, Assignee by mesne assignments of Joseph F. Sargent, deceased
by Crosby & Gregory Attys.

3 Sheets—Sheet 2.

J. F. SARGENT, dec'd,

G. McKay, principal trustee, and J. W. Brooks, associate trustee, of The McKay Metallic Fastening Association, assignees by mesne assignments.

NAILING OR PEGGING MACHINE.

No. 9,888. Reissued Oct. 4, 1881.

Fig. 3.

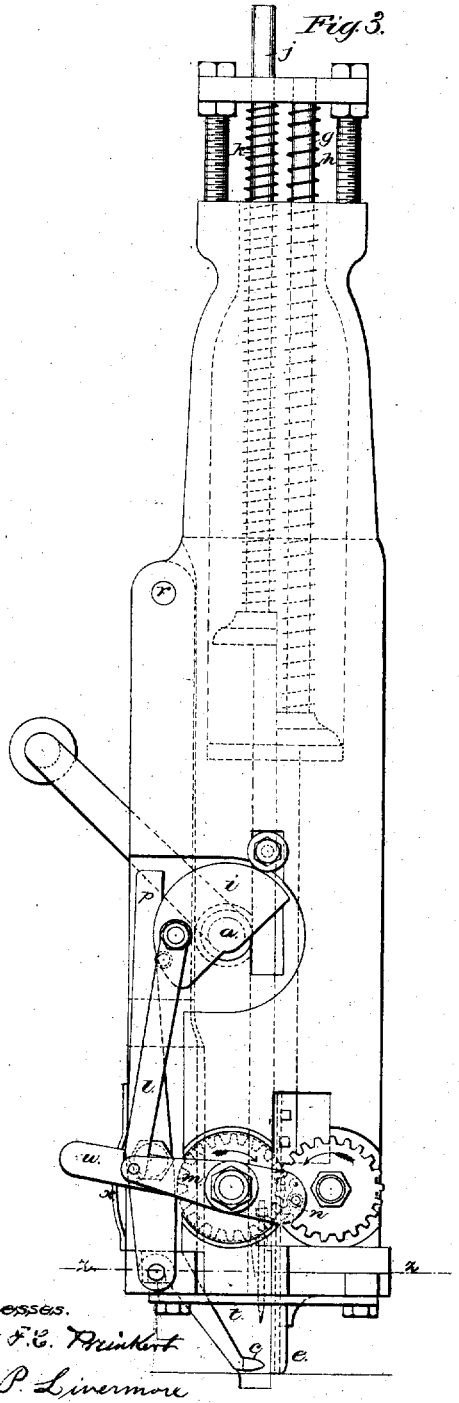

Fig. 4.

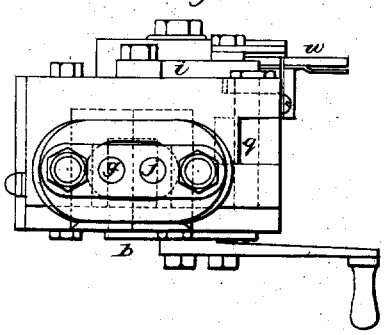

Fig. 5.

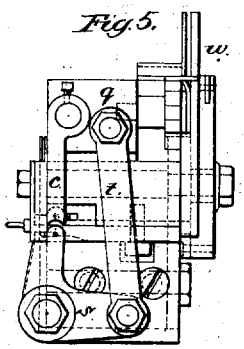

Witnesses.
John F. C. Prinkert
Jos. P. Livermore

Inventor.
Gordon McKay & James H. Brooks
Trustees McKay Metallic Fastening Association, assignees by mesne assignments of Joseph F. Sargent, deceased.
by Crosby & Gregory Attys 3 Sheets—Sheet 3.

J. F. SARGENT, dec'd,

G. McKay, principal trustee, and J. W. Brooks, associate trustee, of The McKay Metallic Fastening Association, assignees by mesne assignments.

NAILING OR PEGGING MACHINE.

No. 9,888. Reissued Oct. 4, 1881.

Fig. 6.

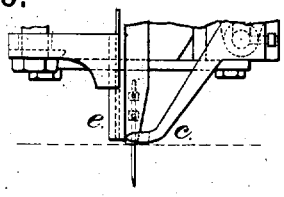

Fig. 7.

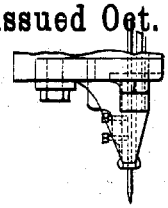

Fig. 8.

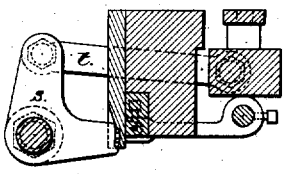

Fig. 9.

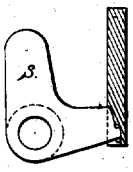

Fig. 10.

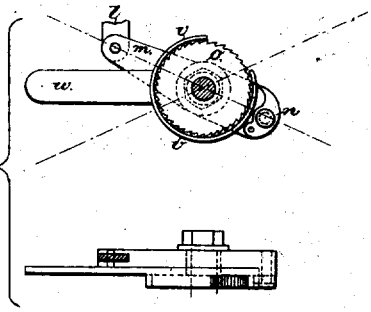

Fig. 11.

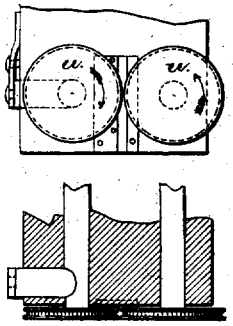

Fig. 12.

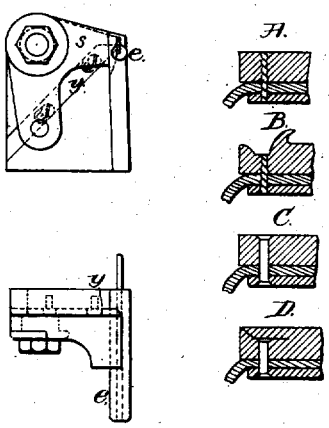

Fig. 13.

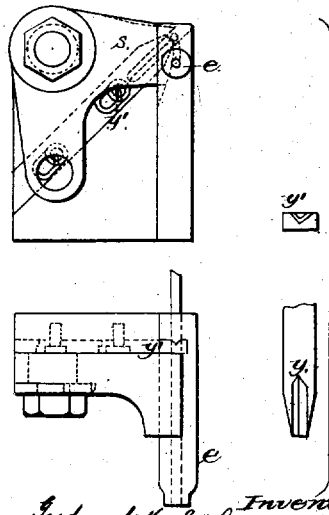

Witnesses.
John F. C. Reinhart
Jos. P. Livermore

Inventor:
Gordon McKay and James W. Brooks,
Trustees McKay Metallic Fastening Association, Assignees by mesne assignments of Joseph F. Sargent, deceased.
by Crosby & Gregory Attys.

UNITED STATES PATENT OFFICE.

GORDON McKAY, OF CAMBRIDGE, MASSACHUSETTS, PRINCIPAL TRUSTEE, AND JAMES W. BROOKS, OF CAMBRIDGE, MASSACHUSETTS, ASSOCIATE TRUSTEE, OF THE McKAY METALLIC FASTENING ASSOCIATION, ASSIGNEES, BY MESNE ASSIGNMENTS, OF JOSEPH F. SARGENT, DECEASED.

NAILING OR PEGGING MACHINE.

SPECIFICATION forming part of Reissued Letters Patent No. 9,888, dated October 4, 1881.

Original No. 77,104, dated April 21, 1868. Application for reissue filed August 27, 1881.

*To all whom it may concern:*

Be it known that JOSEPH F. SARGENT, formerly of Boston, Massachusetts, Suffolk county, but now deceased, invented certain Improvements in Nailing or Pegging Machines, of which the following, taken in connection with the drawings accompanying and forming part of this specification, is a description.

Of the drawings, which represent a machine and parts and modifications thereof embodying the invention, Figure 1 is a side elevation, Fig. 2 a front elevation, and Fig. 3 a rear elevation, of what is known technically as the "head" of a machine. In this connection it may be remarked that the head may be mounted on a fixed frame, in which case the feed-works will operate on a boot or shoe sole to feed the work with reference to the head; or the head may be used as a hand-machine—that is, the boot or shoe being held on a stationary holder, the head is steadied by the hand of the operator, who with the other hand turns the crank to cause the mechanism to operate, and then the whole head will be fed along or around the sole, the head being the moving part and the sole fixed; but where the head is fixed the shaft to which the crank is shown as connected is rotated by any convenient means. Fig. 4 is a top plan of the head, and Fig. 5 is a reverse or underneath plan. Fig. 6 is a front elevation of the parts in the immediate vicinity of the awl and driver, the gage which determines the distance of the nails or pegs from the edge of the sole being removed. Fig. 7 is an end elevation of said parts. In both of said figures, 6 and 7, the awl is represented as in the stock of the sole, while in Figs. 2 and 3 the awl is shown withdrawn. Fig. 8 is a plan and horizontal section, showing the cutter and carrier which operates to cut from a continuous wire-like piece short sections, which are then carried under the path of action of the driver. In said view the section is taken in the plane of the line *z z* seen in Figs. 1, 2, and 3. Fig. 9 shows the cutter and carrier in plan, its position in this figure being that which it has after a section of wire has been cut off and conveyed under the driver, when said cutter and carrier forms one-half of the upper part of the nail-tube in which the driver works. In Fig. 8 the carrier is shown as in position to cut a nail or peg from the length of material supplied for the purpose. Fig. 10 shows, both in elevation and in plan, the ratchet-wheel, pawl-lever, and ratchet-shield by which the wheels which feed the long wire to the cutter are operated so as to give nails of any desired length. Fig. 11 shows, both in elevation and in plan, the wheels which operate on the wire to feed it down to the cutter.

On the main shaft *a*, to which power may be applied by hand or otherwise to rotate it, is a disk or plate, *b*, the periphery of which acts as a cam to force down the feed-foot *c* against the action of spring *d* to transfer contact of the sole-face from the end of the nail-tube *e*. On the inner side of said plate *b* is a pin or roll, *f*, which operates on a projection on the driver-bar *g* to lift it against the action of the spring *h*. On the other end of the shaft *a* is a cam, *i*, which operates on a pin or roll in the awl-bar *j* to lift it against the action of spring *k*. On the outside of cam *i* is fixed a crank-pin, which, through link *l*, works the lever *m*, which carries the pawl *n*, which works the wire-feed ratchet-wheel *o*.

On the inside of cam *i* is fixed a wiper-pin, which operates against a lever, *p*, to cause said lever to move the swing-piece *q*, which is pivoted at *r*, there being a spring which acts in opposition to the wiper-pin. The feed-foot bar being fitted in said piece *q*, it will be obvious how the feeding movement of the machine or of the stock with reference to the machine is produced.

The cutter and carrier of the wire is formed in one end of a bent or angled lever, *s*, which is moved through the link *t*, which, taking hold of the other end of said lever, connects it with the swing-piece *q*, so that as the feed movement takes place by which the distance apart of the nails is determined the wire is cut off from the coil and is conveyed under the driver, by which it is driven into the sole.

On the shaft to which the ratchet-wheel *o* is fixed is a spur-gear, which meshes into an equal spur-gear on a parallel shaft, the two shafts having on their other ends wheels which have serrated grooves around their peripheries. These wheels, which are marked *u*, are so located that the point where they bite upon the wire is directly in the axial line of the wire where it passes to the action of the cutter and carrier, the wheels rotating intermittingly inward and downward, as shown by the arrows thereon marked. One of the parallel shafts referred to is mounted in movable boxes, so that under the action of an adjustable spring thereon one feed-wheel is kept pressed toward the other to give a yielding bite or gripe upon the wire.

As it is desirable to be able to feed various lengths of wire to the action of the cutter to obtain desirable lengths of nails, and as the stroke of the pawl is constant and would give a constant feed, the following means are used for making more or less of the stroke of the pawl effective in turning the ratchet-wheel: Pivoted on the ratchet-wheel shaft is a shell, *v*, which covers part of the periphery of the ratchet-wheel. Part of this shell is cut away so as to expose a portion of the periphery of the ratchet-wheel *o*. Now, by adjustment of this shell more or less of it may be present under the pawl, so that the pawl in moving travels over more or less of the shell, and thus acts upon a number of teeth of the ratchet proportioned to the adjustment of the shell. The shell is turned on its center by an arm, *w*, which is provided with a spring-catch, which can mesh into any one of the notches made in a notched rack, *x*.

The operation of the mechanism described is as follows: The crank being in the position shown in Fig. 2, the lower end of the peg-tube is in contact with the sole, and so also is the lower end of the driver. Now, by turning the crank in the direction indicated by the arrow the feed-foot, being free from contact with the sole, moves away from the tube, and then is forced down upon the sole, transferring contact from the tube end to the feed-foot, and then the awl descends under the influence of its spring and makes a hole in the sole, from which the awl immediately withdraws and the driver moves up to be in readiness to make its downward stroke to drive a nail into the hole made by the awl, and the feed-foot causes movement which brings the awl-hole under the tube through which the driver descends. While the awl moves upward the wheels *u* are operated to draw down a portion of the wire from the reel on which it is wound, and as the feed-foot moves toward the nail-tube *e* the reciprocating cutter and carrier operates to cut off a nail from the wire and to convey it from the line in which it is drawn off from its reel to the line in which the driver operates. The driver having descended and driven the nail in the tube out therefrom into the sole, the cutter and carrier is returned to its starting-point, the feed-foot rises, and transfers contact with the sole from itself to the end of the nail-tube preparatory to drawing away from the nail-tube. The nail-tube is made of an upper and a lower part. The lower part is a tube drilled in solid material, and its length is at least equal to the longest nail which is to be driven. The upper part is of equal length to the lower part, and it is made of two parts, separated longitudinally, one-half being in the moving piece *s*. By the feed-wheels the wire is thrust through a steel tube or groove of about the diameter of the wire when the cutter and carrier is in the position shown in Fig. 8. The upper edge of the cutter and carrier being in contact with the under end of the steel tube or groove above it, movement of the cutter and carrier to the position seen in Fig. 9 severs a piece from the long length of wire. The cut thus made is substantially square, and, as it may be of some utility to point the entering ends of the wire pieces, some devices for that purpose are shown in the drawings.

Fig. 12 shows in plan and in elevation a device which cuts out a kind of triangular section from the wire which is to receive the action of the driver square, and the end of the wire above, which will be the entering end of the next nail beveled from one side to the other. In this case there is fitted above the carrier and in the material of the solid tube above a slide moving in the joint of said pieces, said slide acting not only to cut off the nails from the wire, but to point the nails as well. The slide thus acting as a cutter, the piece *s* has only left the functions of a carrier.

The slide referred to is marked *y* in Fig. 12, and cuts with the end that crosses the tube through which the wire is delivered to the carrier, the edge of the slide being beveled, so as to make the angle or bevel of the nail-points more or less acute, as may be desired.

In Fig. 13 are shown, in plan, elevation, and in detached views, a slide and its arrangement by which the tops of the nails are cut off square and the points are made with two bevels, two triangular chips being removed from the wire in the cutting-off and pointing operation, with the slide shown, which is marked *y'*.

Various kinds of material may be used in this machine—for example, common wire of iron, brass, or copper, or flattened or twisted wire, such as is shown in the detail views marked A B, or thread-peg material, such as is shown in the views C D, the only peculiarities needed in the nail or peg forming material for use with the mechanism described being of sufficient rigidity to enable it to be driven while supported in a tube under the action of a driver and a long wire-like form, so that the nails or pegs are formed from and in the direction of the length of the material.

We claim—

1. The combination, with a tube through which the nail-forming wire is thrust to be cut and a nail-tube through which the nail is driven, of a carrier having an intermittent reciprocating movement to cut and convey the nail from beneath the wire-delivering tube to the nail-tube under the driver, and then return for another nail, substantially as described.

2. The tube or a part thereof through which the nails or pegs are to be forced into or toward the material to be united, made in two parts, capable of being closed, and separated on a longitudinal plane passing through the tube, substantially as and for the purpose specified.

3. A cutter and carrier reciprocating between a wire-delivering tube and a nail-driving tube, and actuated by a lever to effect its forward movement while cutting and conveying a nail, and by a spring to insure its return to position for another nail, substantially as described.

4. The combination of the tube through which the wire is thrust to be subjected to the action of a cutter with a cutter and carrier for severing a nail or peg from the wire or wire-like material and conveying it under the driver, substantially as described.

5. A pair of intermittingly-operating wire-feeding rolls, provided with roughened grooves upon their peripheries, and acted upon by a spring to give a yielding bite or gripe upon the wire, substantially as described.

6. In combination with intermittingly-operating wire-feeding mechanism and cutters for severing the material so fed to form nails or pegs, a tube or groove between the feeding mechanism and the cutters to receive and hold the wire, substantially as described.

7. In combination with feed-wheels for supplying lengths of wire-like material to the cutters, the ratchet-wheel and pawl, and the adjustable shell or shield *v*.

8. A pegging or nailing machine constructed, substantially as described, so as to operate in producing a correct register of the awl-hole beneath the driver by first transferring the contact of the sole from the nail-tube to the feed-foot, then causing the awl to enter and withdraw from the sole, then giving the feeding movement to bring the awl and driver holes in register, and keeping the contact of the feed-foot with the stock till the driver has made its driving stroke, after which, by vertical movement of the feeding-foot, contact of the sole is transferred to the driver-tube.

GORDON McKAY.
JAMES W. BROOKS.

Witnesses for Gordon McKay:
F. F. STANLEY,
G. W. GREGORY.

Witnesses for James W. Brooks:
G. W. GREGORY,
B. J. NOYES.